Figure 1:
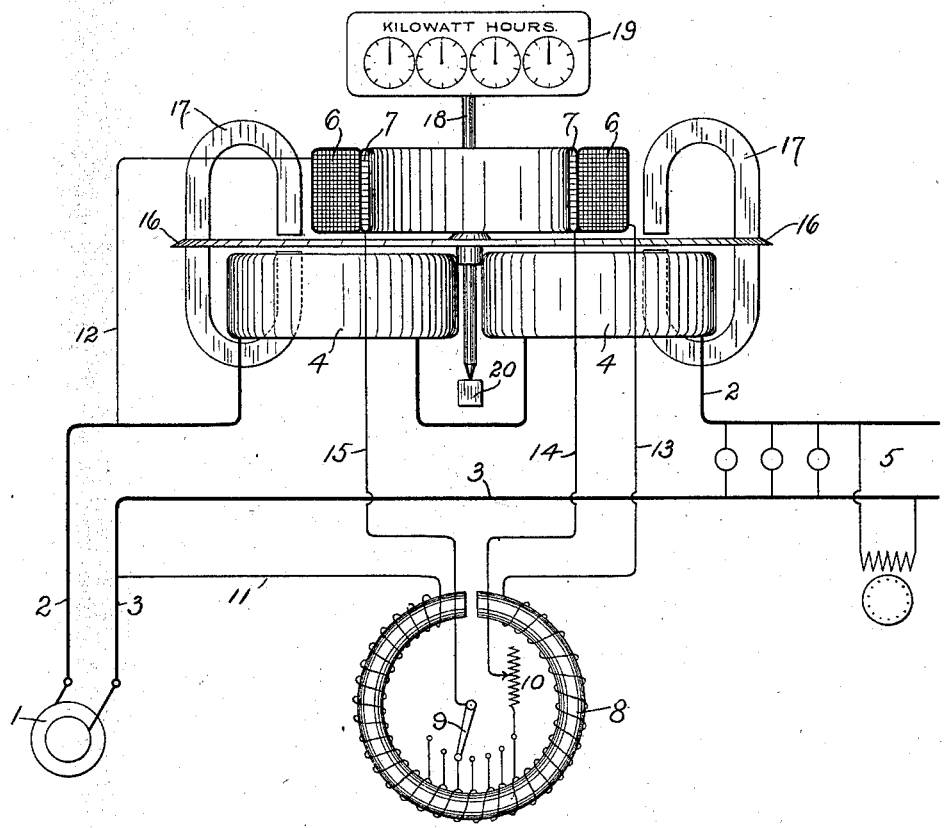

No. 698,641. Patented Apr. 29, 1902.
T. DUNCAN.
ELECTRIC METER.
(Application filed Aug. 1, 1898.)
(No Model.) 2 Sheets—Sheet I.

Witnesses
Samuel A. Bachtel
Adelaide Kearns

Thomas Duncan Inventor
By his Attorneys Chapin & Denny

No. 698,641. Patented Apr. 29, 1902.
T. DUNCAN.
ELECTRIC METER.
(Application filed Aug. 1, 1898.)

(No Model.) 2 Sheets—Sheet 2.

Witnesses
Samuel R. Bachtel.
Adelaide Keane.

Thomas Duncan Inventor
By his Attorneys Chapin & Denny

UNITED STATES PATENT OFFICE.

THOMAS DUNCAN, OF FORT WAYNE, INDIANA, ASSIGNOR TO THE SIEMENS & HALSKE ELECTRIC COMPANY OF AMERICA, OF CHICAGO, ILLINOIS, A CORPORATION OF ILLINOIS.

ELECTRIC METER.

SPECIFICATION forming part of Letters Patent No. 698,641, dated April 29, 1902.

Application filed August 1, 1898. Serial No. 687,390. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

My invention relates to improvements in the method of and means for regulating and adjusting the phase of the magnetism which represents the electromotive force in induction motor-wattmeters, and particularly to the class or type of meters in which the said magnetism is a resultant of two magnetizing coils or fields in coöperative relation.

One object of my invention is to provide an efficient and simple means for adjusting the magnetism of the volt coil or field into quadrature with the electromotive force or for causing it to lag ninety degrees behind the said electromotive force, whereby the meter is enabled to measure inductive loads.

Another object of my present improvement is to enable the meter to measure accurately on varying rates of periodicity, as found among the many systems at present in use.

Another object of my improvement is to provide a simple and cheap means of employing a combined autotransformer and impedance-coil which lags the shunt-current through the volt or pressure field-coil to an amount less than ninety degrees, to also supply part of its current to energize a phase-lagging coil used in inductive relation with the volt or pressure field-coil, and then combining the magnetic fields set up by these two phases of the same current into a resultant magnetic field having a greater lag than the current traversing the impedance-coil. I also find that this means of obtaining a magnetic field in quadrature with the impressed electromotive force is more efficient than that in which a closed secondary alone is used in coöperation with the shunt or volt field-coil, for the reason that it does not require an additional amount of energy in the shunt field-coil as a primary to induce the necessary currents by induction in the closed secondary, and at the same time has all the advantages of receiving a subsidiary shunt-current to augment the lag of the magnetism through the shunt field-coil without the use of a transformer or without being connected directly to the supply-mains and having a resistance in series therewith which incurs extra losses.

In the accompanying drawings, which form part of this specification, similar reference-numerals indicate like parts.

Figure 2:
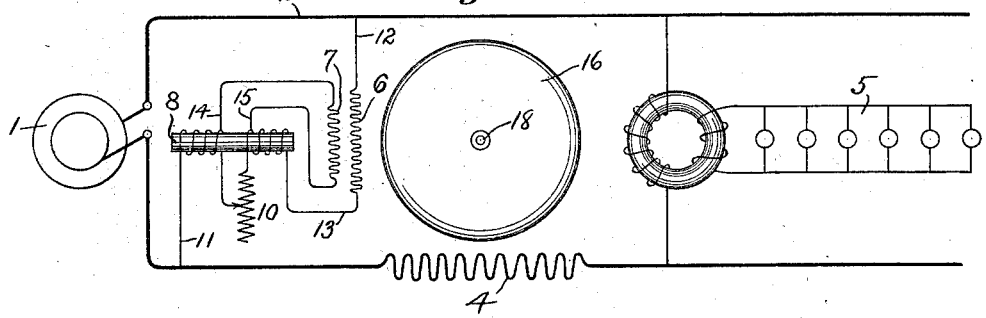
Figure 3:
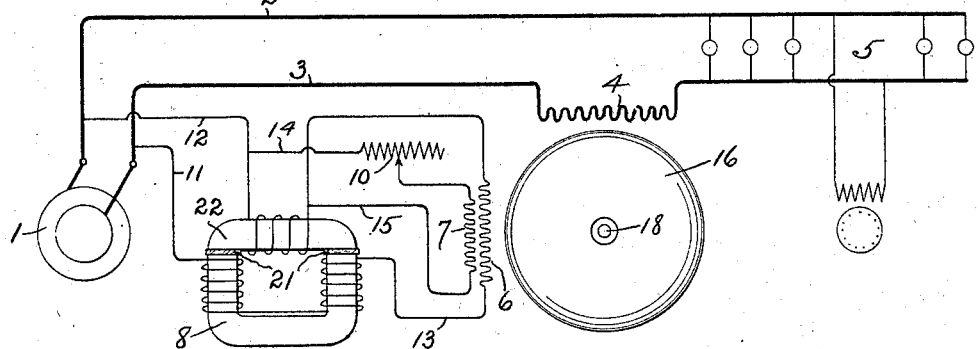
Figure 4:
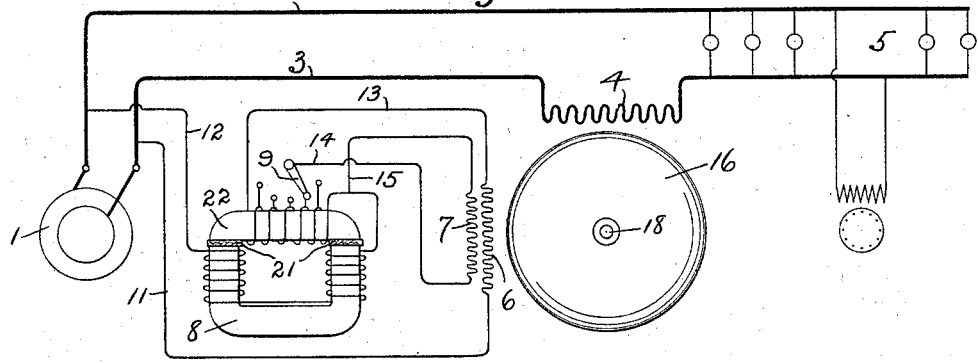
Figure 5:
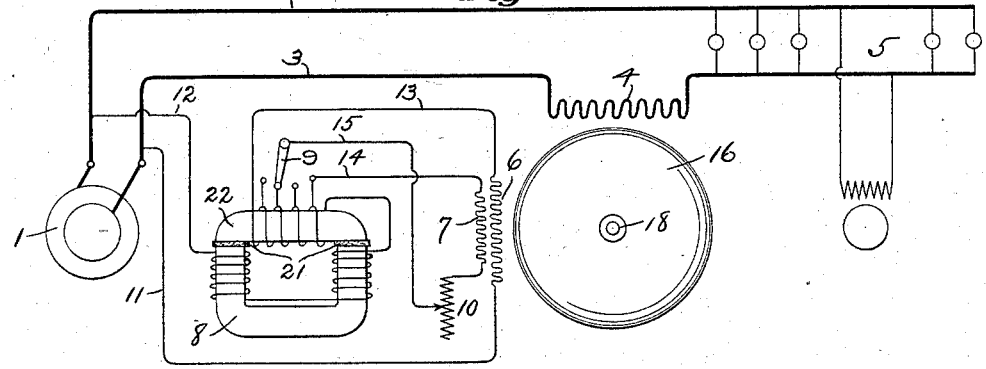

Figure 1 is a front elevation of my improvement with the volt or shunt coils in cross-section. Fig. 2 shows diagrammatically the relative position of the energizing-coils in combination with a cylindrical armature. Figs. 3, 4, and 5 are also modifications of my invention shown diagrammatically and employing a cylindrical type of armature which is described in detail hereinafter.

The principal elements employed in my invention are a series coil or coils, a shunt or volt coil, an auxiliary shunt or volt coil, magnets arranged in coöperative relation with the said armature, an impedance-coil, a registering mechanism, and means for energizing the said auxiliary shunt or volt coil in multiple or shunt to a portion of the turns or convolutions of the impedance-coil.

It is now well understood by those skilled in the art that an induction motor-meter adapted to measure the energy on inductive loads, such as motors, must be so organized that the magnetism, which represents the electromotive force in volts, must be ninety degrees from or in quadrature with said electromotive force and must also be ninety degrees from the magnetism of the series or ampere coil or field when the load in the work-circuit is non-inductive and its current is in phase or step with the line-pressure. When this condition is secured, the torque exerted will be proportional to the real or true watts and the sine of the angle between the magnetism of the volt and ampere coils, respectively.

Referring now particularly to Fig. 1, the generator 1 supplies energy to the translating devices 5 by means of the circuit-leads 2 and 3 and energizes the field or ampere coils 4. Upon a suitable step or bearing 20 is erected the upright revoluble spindle 18, having its upper end in mesh with and adapted to actuate a proper registering-train 19 in a well-understood manner. At a suitable point on said spindle is rigidly fixed an aluminium disk armature 16, arranged in inductive relative relation to the field or ampere coils 4. Adjacent to the upper face of the said disk armature is arranged a shunt or volt coil 6, which is wound with fine wire and is connected in series with a suitable impedance-coil 8, the said coil 6 and the said impedance-coil both being supplied with current in shunt from the mains by means of wires 11, 12, and 13. Within the said volt-coil 6 is arranged an auxiliary coil 7, in coaxial and coöperative relation therewith. The function of the impedance-coil is to assist in causing the current and magnetism of the said coil 6 to lag as nearly as is possible to ninety degrees behind the pressure of the generator 1; but it being understood that the lag of the said impedance-coil must necessarily be somewhat less than ninety degrees I employ the auxiliary coil 7 in coöperative relation with the volt-coil 6 and energize the former with current shunted from a portion of the impedance-coil 8 to obtain the desired quadrature. The terminals of the auxiliary coil 7 are shunted around a portion of the turns or convolutions of the impedance-coil by means of the wires 14 and 15 and a suitable switch 9 and also includes in coöperation therewith a variable resistance 10. If the current and magnetism of the coil 6 lag, say, eighty-five degrees behind the line-pressure, the switch 9 and resistance 10 are adjusted until the magnetism of the coils 6 and 7 form a resultant magnetic field that is exactly ninety degrees or in quadrature. An angle greater than ninety degrees may be easily obtained, if desired. The disk armature 16 is actuated by the shifting magnetism resulting from a combination of the magnetic effects of the said volt and ampere field coils in a well-understood manner. To make the speed of the meter proportional to the energy, I employ the usual permanent magnets 17, which are adapted to embrace the disk 16 between their poles.

Fig. 2 shows a cylindrical type of armature and also shows the resistance 10 shunted around the auxiliary coil 7 at the ends of the wires 14 and 15. This arrangement of the resistance has the advantage of altering or varying the magnitude of the current through both of the coils 6 and 7, thereby quickly and effectively altering the angular displacement of their resultant magnetic field to or from the impressed electromotive force. If the currents through these coils 6 and 7 are adjusted so that their resultant magnetism is exactly ninety degrees behind the pressure and the resistance 10 is then reduced, more current will pass through the coil 6 and less through the coil 7, thereby increasing the magnitude of the magnetism of the coil 6 and reducing that of the coil 7, resulting in a change or displacement of the phase of the resultant magnetism back toward the impressed electromotive force. If the resistance 10 is increased, then the result will be the opposite of the foregoing, in that the resultant magnetism of the coils 6 and 7 will be made to lag more than ninety degrees, since the magnitude of the flux of the coil 6 is decreased and that of the lagging coil increased.

Fig. 3 exhibits a form of impedance-coil, with a detached portion 22, that is separated from the coil proper by the wooden blocks 21. The detachable portion 22 has wound thereon a number of turns which are in series with the windings upon the core 8 and are, in fact, a part of the whole impedance-coil. The terminals 14 and 15 of the lagging coil 7 are connected to the terminals of the windings upon said detachable portion 22. In employing this construction it is found to be very convenient, for the reason that for different windings of the coil 7 the pressure supplying current to energize said coil can be quickly adjusted by varying the number of turns upon the detachable portion when the meter is being tested and also adjusting it for different frequencies.

Fig. 4 shows the detachable portion 22 wound in such a manner that the several convolutions are connected to suitable contact-points and a switch 9, whereby any or all of them may be cut into circuit to obtain the requisite pressure to supply the proper amount of current to the lagging-coil 7. With this arrangement I find that the variable resistance 10 may be dispensed with, provided that the drop or pressure over each convolution on the detachable part 22 is not too great. This, however, can easily be averted in designing the impedance-coil when it is desired to eliminate the resistance 10. For accurate work, however, combined with quickness of testing, the arrangement shown in Fig. 5 is preferable. This figure shows the variable resistance 10 in combination with the variable contact-switch 9 for switching in any desired number of turns wound upon the detachable portion 22 of the impedance-coil core. This arrangement also provides a ready means for adjusting the meter for different pressures without necessitating a change in the turns wound upon the portion 22—such, for example, as a case in which a one-hundred-volt meter is to be calibrated for, say, two hundred volts, the switch may be moved to cut out one or more of the turns wound upon the portion 22 and the wooden blocks 21 made smaller, so as to allow the said portion 22 to come nearer to the portion 8, thereby increasing the self-induction of the impedance-coil and preventing the flow of too much current through the shunt-circuit when the pressure is doubled.

I am aware that the use of two coils supplied by currents differing in phase to produce a lagging magnetic field—that is, in quadrature with the impressed electromotive force—is now well established in the art and to which the present invention lays no claim, but are here used merely in combination with the herein-described means of obtaining and employing two currents differing in phase derived from a combined autotransformer and impedance-core for the purpose set forth without the use of a closed secondary, parallel transformer, or other shunt-circuit receiving current from the supply-mains, providing thereby a meter to comply with the present demands of the central-station manager, which must embody simplicity with the highest efficiency.

It will be observed that the different embodiments of the invention illustrated, for example, in Figs. 1 and 2 each possess an impedance-winding and a phase-modifying portion included between turns of the impedance-winding. In Fig. 2 this phase-modifying portion is a resistance 10, while in Fig. 1 the phase-modifying portion is a metallically-continuous part, or, in other words, the secondary of the autotransformer.

Having thus briefly described the construction and operation of my invention, what I desire to secure by Letters Patent is—

1. In a system of alternating-current distribution, the combination with an alternating-current generator of current and pressure field-windings of a meter receiving current from said generator, the latter winding being divided into two coils, an autotransformer having its winding included conductively in circuit with one of the pressure-coils and a portion of its winding included conductively in circuit with the remaining pressure-coil, and a measuring device subjected to the action of the field-windings, substantially as described.

2. In a system of alternating-current distribution, the combination with an alternating-current generator of current and pressure field-windings of a meter receiving current from said generator, the latter winding being divided into two coils, an autotransformer having its winding included conductively in circuit with one of the pressure-coils and a portion of its winding included in a closed local circuit, the remaining pressure-coil being also included in circuit with the latter portion of the autotransformer, the coils of the pressure-winding being inductively related, and a measuring device subjected to the action of the field-windings, substantially as described.

3. In a system of transmission, the combination with an alternating-current generator of current and pressure field-windings of a meter receiving current from said generator the latter winding being divided into two inductively-related coils, an autotransformer having its winding included conductively in circuit with one of the pressure-coils and a portion of its winding included conductively in circuit with the remaining pressure-coil, and an armature in inductive relation to the said pressure-coils, substantially as described.

4. In a system of alternating-current distribution, the combination with an alternating-current generator of current and pressure field-windings of a meter receiving current from said generator, the latter winding being divided into two coils, an autotransformer having its winding included conductively in circuit with one of the pressure-coils and a portion of its winding included conductively in circuit with the remaining pressure-coil, a measuring device subjected to the action of the field-windings, and a phase-adjusting device also in circuit with the latter pressure-coil and the said portion of the autotransformer-winding, substantially as described.

5. In a system of alternating-current distribution, the combination with an alternating-current generator of current and pressure field-windings of a meter receiving current from said generator, the latter winding being divided into two coils, an autotransformer having its winding included conductively in circuit with one of the pressure-coils, the coils of the pressure-winding being inductively related, a measuring device subjected to the action of the field-windings, and a phase-adjusting device in circuit with the remaining pressure-coil and the secondary portion of the autotransformer-winding, substantially as described.

6. In a system of transmission, the combination with an alternating-current generator of current and pressure field-windings of a meter receiving current from said generator the latter winding being divided into two inductively-related coils, an autotransformer having its winding included conductively in circuit with one of the pressure-coils and a portion of its winding included conductively in circuit with the remaining pressure-coil, an armature in inductive relation to the said pressure-coils, and a phase-adjusting device also in circuit with the latter pressure-coil and the said portion of the autotransformer-winding, substantially as described.

7. In a system of alternating-current distribution, the combination with an alternating-current generator of current and pressure field-windings of a meter receiving current from said generator, the latter winding being divided into two coils, an autotransformer having its winding included conductively in circuit with one of the pressure-coils and a portion of its winding included conductively in circuit with the remaining pressure-coil, a measuring device subjected to the action of the field-windings, and a phase-adjusting device also in series with the latter pressure-coil and the said portion of the autotransformer-winding, substantially as described.

8. In a system of alternating-current distribution, the combination with an alternating-current generator of current and pressure field-windings of a meter receiving current from said generator, the latter winding being divided into two coils, an autotransformer having its winding included conductively in circuit with one of the pressure-coils, the coils of the pressure-winding being inductively related, a measuring device subjected to the action of the field-windings, and a phase-adjusting device in series with the remaining pressure-coil and the secondary portion of the autotransformer-winding, substantially as described.

9. In a system of transmission, the combination with an alternating-current generator of current and pressure field-windings of a meter receiving current from said generator the latter winding being divided into two inductively-related coils, an autotransformer having its winding included conductively in circuit with one of the pressure-coils and a portion of its winding included conductively in circuit with the remaining pressure-coil, an armature in inductive relation to the said pressure-coils, and a phase-adjusting device also in series with the latter pressure-coil and the said portion of the autotransformer-winding, substantially as described.

10. In a system of alternating-current distribution, the combination with an alternating-current generator of current and pressure field-windings of a meter receiving current from said generator, the latter winding being divided into two coils, an autotransformer having its winding included in series with one of the pressure-coils, and a portion of its winding included conductively in circuit with the remaining pressure-coil, and a measuring element, substantially as described.

11. In a system of alternating-current distribution, the combination with an alternating-current generator of current and pressure field-windings of a meter receiving current from said generator, the latter winding being divided into two coils, an autotransformer having its winding included in series with one of the pressure-coils, and a portion of its winding included in series with the second pressure-coil, and a measuring element, subjected to the action of the field-windings, substantially as described.

12. In a system of alternating-current distribution, the combination with the source of alternating current of two field-windings of a meter, one of said windings being divided into two coils, of an autotransformer having its winding included conductively in circuit with one of said coils and a portion of its winding included conductively in circuit with the other of said coils, and a measuring device subjected to the action of the field-windings, substantially as described.

13. In a system of alternating-current distribution, the combination with the source of alternating current of two field-windings of a meter, one of said windings being divided into two inductively-related coils, of an autotransformer having its winding included conductively in circuit with one of said coils and a portion of its winding included conductively in circuit with the other of said coils, and a measuring device subjected to the action of the field-windings, substantially as described.

14. In a system of alternating-current distribution, the combination with the source of alternating current of two field-windings of a meter, one of said windings being divided into two inductively-related coils, of an autotransformer having its winding included in series with one of said coils, and a portion of its winding included conductively in circuit with the other of said coils, and a measuring device subjected to the action of the field-windings, substantially as described.

15. In a system of alternating-current distribution, the combination with the source of alternating current of two field-windings of a meter, one of said windings being divided into two inductively-related coils, of an autotransformer having its winding included in series with one of said coils, and a portion of its winding included in series with the remaining coil, and a measuring device subjected to the action of the field-windings, substantially as described.

16. In a meter, the combination with current and pressure field-windings, the pressure field-winding being divided into two coils, of an impedance-winding in series with one of said coils, the remaining pressure field-coil being in a closed circuit with a metallically-continuous phase-modifying portion of the impedance-winding, substantially as described.

17. In a meter, the combination with current and pressure field-windings, the pressure field-winding being divided into two coils, of an impedance-winding in circuit with one of said coils, the remaining coil being in circuit with a metallically-continuous portion of the impedance-winding, substantially as described.

18. In a phase-modifying means, the combination with two field-coils, of an impedance-winding in circuit with one of said coils, a phase-modifying element being included between turns of the impedance-winding, the remaining coil being included in a closed circuit with the said phase-modifying element, substantially as described.

19. In a meter, the combination with current and pressure field-windings, the pressure field-winding being divided into two coils, of an impedance-winding in circuit with one of said coils, a phase-modifying element being included between turns of the impedance-winding, the remaining coil being included in a closed circuit with the said phase-modifying element, substantially as described.

Signed by me at Fort Wayne, Allen county, State of Indiana, this 29th day of July, A. D. 1898.

THOMAS DUNCAN.

Witnesses:
M. G. WEBBER,
CHARLES C. MILLER.